May 2, 1939. F. RAFFLES Re. 21,070

HEATING ELEMENT

Original Filed Feb. 3, 1934

FRANK RAFFLES
INVENTOR

PER Albert J. Fihe

ATTORNEY

Reissued May 2, 1939

Re. 21,070

UNITED STATES PATENT OFFICE 21,070

HEATING ELEMENT

Frank Raffles, Chicago, Ill.

Original No. 2,014,196, dated September 10, 1935, Serial No. 709,639, February 3, 1934. Application for reissue June 29, 1937, Serial No. 151,022

3 Claims. (Cl. 219—26)

This invention relates to an improved heating element and has, for one of its principal objects, the provision of a self-contained electrical resistance unit whereby a far greater amount of heat can be concentrated at a given point than has heretofore been considered possible.

One of the important objects of this invention is to provide an electrical heating unit or the like which, although made available for small instruments and rather delicate operations, eliminates the necessity of a transformer or any resistance which has ordinarily been considered necessary with devices of this sort.

Another important object of the invention is to provide a heating element wherein the desired temperature is concentrated at the end of the element and over a relatively small area which is especially advantageous in devices of this sort.

Another and still further important object is the provision in a heating element of a novel form of refractory support for the resistance wire which, although of small diameter, possesses considerable strength and which, in connection with a suitable refractory cement, will effectively guard against short circuiting.

One of the definite objects of this invention is to provide a heating element, which can be used in the form of a pencil for pyrography and also for delicate soldering jobs and the like, wherein the source of heat is positioned on a porcelain or some other insulating support which, in turn, is surrounded by a metal element to be used in the transferring of the heat to desired points, the element itself being supported in a pencil-style handle which allows for proper insulation against heat for the protection of the user's fingers and hands.

Another and still further important object of the invention is the provision in a heating element such as the type used in soldering irons or the like of a special winding wherein a constant heat is always available at any fixed voltage such as 110 volts or 220 volts, and which can, furthermore, be suitably and efficiently operated on both alternating and direct current.

Other and further important objects of the invention will be apparent from the disclosures in the accompanying drawing and following specification.

The invention, in a preferred form, is illustrated in the drawing and hereinafter more fully described.

Figure 1:
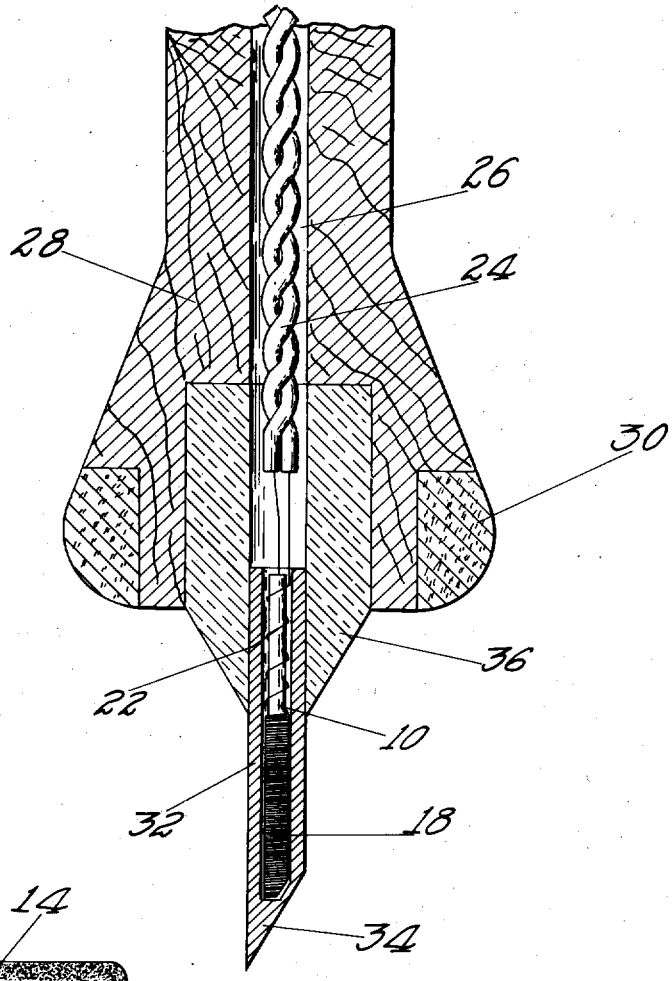
Figure 1 is an enlarged sectional view of the improved heating element of this invention, showing the pencil-style holder therefor.

The reference numeral 10 indicates generally a support composed of porcelain or some other suitable refractory material which has an opening 12 extending through the middle thereof, and through this opening is passed a wire 14 which is of the usual high resistance type whereby the passage of a current of electricity therethrough generates considerable heat.

Figure 2:
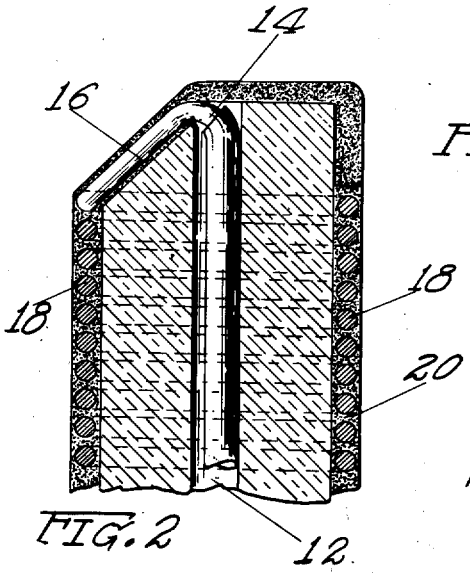
Figure 2 is a still further enlarged sectional view of the heating element itself and its insulating support.

The end of a porcelain tube or support 10 is beveled as best shown at 16 in Figure 2, this bevel extending inwardly to the edge of the opening 12 and over this beveled edge passes the wire 14 which is then brought down below the end of the element 10 and wound in helical shape around the surface thereof as best shown at 18. The spaces between the windings of the wire 18 are filled with a suitable refractory and insulating cement 20 which prevents short circuits and also retains the wire windings 18 in desired position.

The windings 18 are very closely associated at the outer end of the support 10 where the concentration of heat is desired, and toward the rear of the support, the windings are spaced much farther apart as shown at 22 in Figure 1, finally terminating in a pair of extensions which are, in turn, connected to the ends of the usual lamp cord 24 or the like.

This lamp cord is passed through a suitable opening 26 formed in a handle 28 which is preferably of wood or some similar suitable material and which may be of any desired shape to accommodate the hand and fingers of the user.

A band of cork 30 or some other heat insulating material is usually positioned in a suitable groove formed in the end of the handle element 28, thereby providing for additional heat insulating effects.

The heating element 10—18 is itself positioned in a hollow metal holder 32 preferably cylindrical in shape and which, if desired, may be made pointed at its end as shown at 34 for a still further and better concentration of the evolved heat. This metal heat transferring point is mounted in a support 36 of porcelain, refractory cement or the like which, in turn, is positioned in a suitable countersunk opening in the end of the handle 28.

The arrangement of parts and the compactness of the heating element and its support permit of the manufacture of this installation on quite a small scale while, at the same time, the amount of heat units delivered is considerably greater than those ordinarily possible with much larger and more bulky equipment.

The closeness of the windings 18, together with the nature of the refractory insulating cement used and the qualities of the high resistance wire itself, permits of a considerable concentration of the heat at the point 34 of the metal heating element 32 which renders this device particularly desirable for pyrography, small soldering jobs and the like.

Another feature is the bevel at 16 on the end of the insulating support 10 whereby the entire support may be more accurately and closely fitted into the tube 32 and whereby a greater quantity of heat is concentrated at the end of the tube which obviously is the point where the most heat is desired in operations of this kind and in using instruments of this type.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A heating element, including an insulating tube, a high resistance wire passing through the tube and extending out of the end thereof and terminating in windings around the exterior of said tube end, together with a refractory cement surrounding the wire and maintaining the same in position on the support, and insulating each coil from adjacent coils, and a metal tube in which said heating element is positioned, the end of said metal tube being exteriorly and interiorly beveled, and a corresponding bevel at the end of the support for the resistance wire, a length of said resistance wire being positioned in said last-named bevel.

2. A heating element, including an insulating tube, a high resistance wire passing through the tube and extending out of the end thereof and terminating in windings around the exterior of said tube end, together with a refractory cement surrounding the wire and maintaining the same in position on the support, and insulating each coil from adjacent coils, and a metal tube in which said heating element is positioned, the end of said metal tube being exteriorly and interiorly beveled, and a corresponding bevel at the end of the support for the resistance wire, a length of said resistance wire being positioned in said last-named bevel, and the whole mounted to fit closely in the correspondingly interior beveled end of the said metal tube.

3. An electric heating unit, including a working muzzle, a refractory core tube terminating in the muzzle, a wire extending through the tube, a resistance coil, and service connections with and for current through the wire and coil; said tube being cemented in the muzzle; said coil formed of a filament wrapped close on one end of the tube and wide space wrapped medially along the tube so as to form a hot zone entirely within the muzzle.

FRANK RAFFLES.